United States Patent [19]

Duncan

[11] Patent Number: 4,720,416
[45] Date of Patent: Jan. 19, 1988

[54] PRESSURE SENSITIVE LABEL STOCK MATERIAL POSSESSING A WRINKLE-RESISTANT LUSTROUS, OPAQUE LAMINATE FILM FACING

[75] Inventor: Gary L. Duncan, Fairport, N.Y.

[73] Assignee: Mobil Oil Corporation, New York, N.Y.

[21] Appl. No.: 23,511

[22] Filed: Mar. 9, 1987

[51] Int. Cl.$^4$ ............................ A61F 3/02; B32B 3/26
[52] U.S. Cl. ................................. 428/195; 428/198; 428/317.3; 428/317.9; 428/343; 428/349; 428/354
[58] Field of Search ..................... 428/195, 198, 317.3, 428/317.5, 317.7, 317.9, 343, 349, 354

[56] References Cited

U.S. PATENT DOCUMENTS

| | | | |
|---|---|---|---|
| 4,099,943 | 7/1978 | Fischman et al. | 428/317.7 |
| 4,194,041 | 3/1980 | Gore et al. | 428/315.5 |
| 4,331,725 | 5/1982 | Akao | 428/317.5 |
| 4,377,616 | 3/1983 | Ashcraft et al. | 428/317.9 |
| 4,578,297 | 3/1986 | Duncan | 428/317.9 |
| 4,582,736 | 4/1986 | Duncan | 428/317.3 |
| 4,587,158 | 5/1986 | Ewing | 428/219 |
| 4,626,460 | 12/1986 | Duncan | 428/317.3 |

*Primary Examiner*—William J. Van Balen
*Attorney, Agent, or Firm*—Alexander J. McKillop; Michael G. Gilman; Charles J. Speciale

[57] ABSTRACT

A pressure sensitive label stock material possessing a wrinkle-resistant lustrous, opaque biaxially oriented polymer film laminate facing layer for application to a collapsible wall type container is described. The facing layer includes:

(a) a thermoplastic core layer having an upper and lower surface and a strata of voids located within said substrate layer, there being positioned within at least a substantial number of said voids at least one void-initiating particle which is phase distinct and incompatible with the surrounding thermoplastic material, the void space occupied by said particle being substantially less than the volume of said void, with one generally cross-sectional dimension of said particle at least approximating a corresponding cross-sectional dimension of said void;

(b) a void-free thermoplastic skin layer affixed to the upper surface and, optionally, to the lower surface of core layer (a), and;

(c) discrete areas of pressure sensitive adhesive directly or indirectly applied to the exposed surface of core layer (a) or, where an optional skin layer (b) has been applied to the lower surface of core layer (a), to the exposed surface of optional skin layer (b), the adhesive-free areas of the exposed surface of core layer (a), or, where present, the adhesive-free areas of the exposed surface of optional skin layer (b), exhibiting little or no tendency to adhere to the material of the collapsible wall type container to which the facing layer is applied.

14 Claims, No Drawings

PRESSURE SENSITIVE LABEL STOCK MATERIAL POSSESSING A WRINKLE-RESISTANT LUSTROUS, OPAQUE LAMINATE FILM FACING

BACKGROUND OF THE INVENTION

This invention relates to the field of pressure sensitive labels.

In a typical process for manufacturing pressure sensitive adhesive labels, a solution of a pressure sensitive material is continuously and uniformly applied to the reverse side of a substrate, or face stock, usually paper, in the form of a continuous web and dried. Thereafter a release sheet usually provided as a continuous paper web coated with a release agent, is applied to the exposed pressure sensitive adhesive surface to form a substrate-pressure sensitive adhesive-release sheet label stock which is then wound on a rewind roll for further processing such as sheeting, slitting or other converting. After that, the label stock is typically printed, cut and collated by a printer to form individual printed sheets. Such sheets may be utilized for any number of uses including name tags, stickers, labels, etc., by simply peeling away the release paper and pressing the adhesive-coated side of the face sheet to the desired surface.

U.S. Pat. No. 4,587,158 describes a polyethylene-based label for application to collapsible wall type containers, e.g., squeeze bottles, for dispensing a variety of liquids and solids. The label is said to have the ability to adhere to flexible surfaces throughout severe mechanical stress, temperature change or atmospheric exposure without shrinking, loosening, scratching or otherwise defacing. The label is corona treated or otherwise modified to render the surface more suitable for printing and for essentially permanent bonding employing pressure separative adhesives characterized by their ability to cure to permanent set while maintaining an elastic nature, e.g., copolymers of acrylic esters such as 2-ethylhexyl acrylate with polar co-monomers such as acrylic acid. From examples illustrating the manufacture of such a label, it is clear that the pressure sensitive adhesive is intended to be applied more or less uniformly to an entire surface thereof.

U.S. Pat. No. 4,377,616, the contents of which are incorporated by reference herein, discloses a lustrous, opaque biaxially oriented polymer laminate film structure comprising a thermoplastic polymer matrix core layer possessing numerous voids, a substantial number of which contain at least one void-initiating particle, and transparent skin layers adhering to the surfaces of the core layer. The unique structure of the core layer imparts a much higher degree of opacity, possibly due to the effects of light scattering, than that possible by the use of opacifying pigment alone.

U.S. Pat. Nos. 4,582,736 and 4,626,460, the contents of which are also incorporated by reference herein, each describes a coextruded pressure sensitive label stock material possessing an integral peelable backing and a facing component based on the lustrous, opaque laminate film of U.S. Pat. No. 4,377,616.

It has been observed that when a label facing based on the lustrous, opaque laminate film of U.S. Pat. No. 4,377,616 which possesses a substantially continuous, uniformly applied layer of pressure sensitive adhesive on its reverse side is applied to a collapsible wall type container, e.g., a squeeze bottle or flexible tube container, there is a pronounced tendency for the label to form permanent unsightly creases, or wrinkles, when the container is compressed to dispense product therefrom. Repeated use of such a container will often result in a large number of creases the overall appearance of which can be likened to shattered glass.

While the reason for this phenomenon is not known with certainty, studies of the problem appear to indicate that compression of the bottle to dispense its contents results in differential movement of the outermost layer of the laminate facing relative to the innermost layer which tends to remain anchored in place on the container wall by the pressure sensitive adhesive. This differential movement is believed to result from the separating and tearing away of the outermost layer from the innermost layer, the aforementioned wrinkled appearance of the label being the visual result of this structural deformation in the label facing.

Whatever may be the actual explanation for the foregoing wrinkling phenomenon, the fact remains that such wrinkling constitutes a significant drawback to the use of the lustrous, opaque laminate film of U.S. Pat. No. 4,377,616 as a pressure sensitive label facing for application to collapsible wall type containers.

SUMMARY OF THE INVENTION

It has now been discovered that if instead of applying a substantially continuous layer of pressure sensitive adhesive to the reverse side of a label facing based on the lustrous, opaque laminate film structure of U.S. Pat. No. 4,377,616 as in the conventional practice of applying adhesive to a face stock, the adhesive is applied to the label facing in a discontinuous manner to provide a pattern of discrete areas of pressure sensitive adhesive covering less than the entire area of the label facing, the resulting facing will exhibit significantly less tendency to wrinkle when deformed.

In accordance with the present invention, there is provided a pressure sensitive label stock material possessing a wrinkle-resistant lustrous, opaque biaxially oriented polymer film laminate facing layer for application to a collapsible wall type container, the facing layer comprising:

(a) a thermoplastic core layer having an upper and lower surface and a strata of voids located within said substrate layer, there being positioned within at least a substantial number of said voids at least one void-initiating particle which is phase distinct and incompatible with the surrounding thermoplastic material, the void space occupied by said particle being substantially less than the volume of said void, with one generally cross-sectional dimension of said particle at least approximating a corresponding cross-sectional dimension of said void;

(b) a void-free thermoplastic skin layer affixed to the upper surface and, optionally, to the lower surface of core layer (a), and;

(c) discrete areas of pressure sensitive adhesive directly or indirectly applied to the exposed surface of core layer (a) or, where an optional skin layer (b) has been applied to the lower surface of core layer (a), to the exposed surface of optional skin layer (b), the adhesive-free areas of the exposed surface of core layer (a), or, where present, the adhesive-free areas of the exposed surface of optional skin layer (b), exhibiting little or no tendency to adhere to the material of the collapsible wall type container to which the facing layer is applied.

DESCRIPTION OF THE PREFERRED EMBODIMENTS

The resins from which core layer (a) and skin layer(s)(b) of the facing layer can be fabricated are widely employed in the manufacture of polymer films and include polyethylene, polypropylene, polybutene and copolymers and compatible/compatibilized blends thereof. A crystalline polypropylene containing at least 80% by weight of isotactic polypropylene and having a melt flow index of from about 4 to 8 g/10 minutes is advantageously used for both the core layer and the skin layer(s).

As disclosed in U.S. Pat. No. 4,377,616, in order to achieve the lustrous, opaque appearance of the laminate constituting the facing layer of the pressure sensitive label stock material herein, it is important that a particular thickness relationship exist between the thickness dimension of core layer (a) and the thickness dimension of skin layer(s)(b). It is preferred that the thickness be from about 30 to about 85% of the overall structure. This, in combination with the population and configuration of the voids in a structure of at least about 0.5 mils thick, will materially contribute to the overall degree of opacity of the structure. The population and configuration of the voids and the core thickness will be such as to cause a significant degree of opacity, for example, less than about 70% light transmission. Similarly, by maintaining the thickness of the skin layer(s) within a particular range in relation to the overall thickness of the facing layer and to the thickness of core layer (a), the overall combination will exhibit a lustrous pearlescent appearance. It is preferred that the total thickness of the skin layer(s)(b) constitute from about 5 to about 70% of the total thickness of the facing layer, the balance of the thickness being contributed by core layer (a). It is important that the upper skin layer (b) be sufficiently thick so that its outer surface will not manifest the rough texture or surface irregularities of underlying core layer (a). If this were not the case, the lustrous appearance of upper skin layer (b) would be significantly lessened.

It is preferred that the average diameter of the void-initiating particles contained within core layer (a) be from about 0.1 to about 10 microns. These particles are preferably approximately spherical in shape so as to initiate the formation of geometrically regular voids in a stratified relationship throughout the surrounding thermoplastic material of the core following biaxial orientation of the entire laminate facing layer. This does not mean that every void must be the same in size. It means, generally speaking, that the voids will be of a similar shape even though they may vary in their dimensions because they are all initiated by a substantially spherical particle. Ideally, all of the voids possess a shape defined by two opposed and edge-contacting concave disks, i.e., they are approximately lenticular in character.

Optimum characteristics of opacity and lustrous appearance are obtained when the two average major void dimensions are greater than about 30 microns.

As indicated above, the material constituting the void-initiating particles must be incompatible, i.e., immiscible, with the surrounding thermoplastic resin of core layer (a), at least at the temperature of biaxial orientation.

Core layer (a) has been described above as a thermoplastic polymer within which is located a strata of voids. The term "strata" is intended to convey the understanding that there are a large number of voids within the core layer and the voids themselves are oriented so that their two major dimensions (length and width) are aligned to correspond to the direction of orientation of the facing layer structure. After each void has been formed, the void-initiating particles may contribute little else to the substrate layer. This will occur when the refractive index of the void-initiating particles is close enough to that of the surrounding thermoplastic material that the former will make no appreciable contribution to opacity. When this is the case, opacity will result principally as a result of the light scattering effect brought about by the voids. The opacity of the core layer can be increased somewhat by incorporating an opacifying pigment such as titanium dioxide or zinc oxide therein. A particularly preferred proportion of pigment in core layer (a) can range from about 1% to about 3% by weight of this layer. The particle size and shape of the pigment material is such that it will not contribute to void formation to any significant degree. The presence of optional opacifying pigment may contribute perhaps 3 to 8% of the total opacity of the laminate.

A typical void in core layer (a) may be defined as having major dimensions X and Y and minor dimension Z where dimension X is aligned with the machine direction orientation, dimension Y is aligned with the transverse direction orientation and dimension X approximately corresponds to the cross-sectional dimension of the particle which initiated the void. It is a necessary requirement of the present invention that orientation conditions be such that the X and Y dimensions of the voids present in the core layer be major dimensions in comparison to the Z dimension. Thus, while the Z dimension generally approximates the cross-sectional dimension of the void-initiating particle, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any significant destruction of voids in any of their dimensions. The voids are particularly vulnerable to destruction during sequential orientation if the stretching temperature is too low. Even in simultaneous orientation, if the temperature is too low the stretching forces will tend to cause internal shredding and void splitting. This leads to a complete loss of control over the integrity of the individual closed voids and as a consequence, a deterioration in the integrity of the core layer. Thus, one skilled in the art following the present general guidelines can orient at a temperature and to a degree which will yield Z and Y dimensions approaching a maximum without causing any substantial amount of splitting or shredding of voids or overall lack of integrity of the void-containing core layer.

By way of illustration, room temperature biaxial orientation of a polypropylene layer containing polybutylene terephthalate (PBT) spheres of the size and amount contemplated herein as the void-initiating particles will not produce the structure constituting facing layer herein. Either excessive void splitting will occur or too many voids of insignificant size will result. Polypropylene must be oriented at a temperature which is significantly higher than its glass transition temperature. The temperature conditions must permit X and Y to be at least several multiples of the Z dimension without causing any appreciable amount of void splitting. When this is accomplished, optimum physical characteristics including low water vapor transmission rates and a high degree of light scattering are obtained without significant void splitting or film fibrillating.

As indicated above, the thermoplastic polymer of core layer (a) and the void-initiating particles contained therein must be mutually incompatible, which is to say, they must maintain two distinct phases under the conditions of biaxial orientation employed. The void-initiating particles constitute a dispersed phase within the surrounding lower melting polymer which polymer will, upon orientation, become a void-filled matrix with the void-initiating particles positioned somewhere within the voids.

When the void-initiating particles are comparatively spherical, the resulting voids, or at least most of them, will be closed cells with virtually no path open from one side of the core layer to the other through which liquid or gas can traverse.

The void-initiating particles can be organic or inorganic and can be a polymeric material provided it is one which can be co-melted with the surrounding polymer of the core. A polymeric material used for providing the void-initiating particles must have a melting point which is sufficiently above that of the surrounding core polymer as to be incompatible with the latter and capable of assuming a dispersed phase of small spherical particles as the temperature of the co-melted mix is reduced. It is also contemplated that the void-initiating particles can be preformed and then uniformly dispersed into a melt, e.g., one of polypropylene. This has the advantage of not subjecting the core polymer to the temperature of a much higher melting polymer. In this manner, any thermal degradation of the core polymer can be largely avoided.

It is believed that because of the number, shape and orientation strata-wise of the voids, a significantly enhanced light scattering effect is obtained. This effect is further enhanced or magnified by the presence of an upper skin layer possessing a minimum thickness as disclosed above.

When preformed void-initiating particles are employed, it is the shape and size of the spheres which are more significant factors to the practice of this invention rather than the chemical composition of the particles. Solid or hollow organic or inorganic particles of any type, again, preferably those which are spheroidal, can be employed. Interesting effects can be achieved by the use of particles of different colors. Since statistically each void has approximately one void-initiating particle somewhere within the void, interesting and pleasing color and/or reflection effects can be imparted to the overall facing layer structure by the use of particles of different color absorption or reflectance characteristics. The light scattered in a particular void is additionally either absorbed or reflected by the void-initiating particle and a separate color contribution is made to the light scattering in each void.

The void-initiating particles can be based on any of a variety of thermoplastic resins such as polybutylene terephthalate, polyethylene terephthalate acetals, polyamides, acrylic resins, etc., provided they remain phase distinct and incompatible with the resin constituting the remainder of core layer (a). Polybutylene terephthalate (PBT), also known as polytetramethylene terephthalate (PTMT), is an especially preferred void-initiating material for use herein. This material is a highly crystalline polymer obtained from the polycondensation of dimethyl terephthalate with 1,4-butanediol. PBT possesses good mechanical, chemical and electrical properties. It has good flowability and a rapid crystallization rate. It has a melting point of 440° F. and a glass transition temperature of approximately 104° F. It has good thermostability and relatively high UL temperature indices. This material has good tensile strength, toughness and dimensional stability, low water absorption, and low static and dynamic coefficients of friction. Typical processing conditions for PBT involve melts at 450°–500° F. Melt temperatures in excess of 520° F. are ordinarily to be avoided.

Inorganic materials which are useful as void-initiating particles include solid or hollow preformed glass spheres, metal beads or spheres, ceramic spheres, etc. In fact, any material which can be formed into a sphere without causing thermal degradation to the core polymer is entirely suitable herein.

Employing the polymer film structure of U.S. Pat. No. 4,377,626 as the facing layer of the pressure sensitive stock material herein, light transmission through this layer can be reduced to as low as about 16 percent. This would be the case with a facing layer having an overall thickness of at least 1.5 mils where the thickness of core layer (a) is at least about 60 percent with the thickness of skin layer(s)(b) contributing to the balance of the thickness of this layer.

While a preferred average particle size of the void-initiating particles is from about 0.1 to about 10 microns, it is particularly advantageous to employ particles having an average size within the range of from about 0.75 to about 2 microns. The void-initiating particles can be present in up to about 20 percent by weight of the entire core layer prior to orientation, a preferred range being from about 2 to about 7 percent by weight.

For convenience and more precise control of the formulation and character of core layer (a), a master batch technique can be employed either in the case of forming the void-initiating particles in situ or in adding preformed void-initiating particles to the molten thermoplastic core material. After the formation of a master batch, appropriate dilution of the batch can be accomplished by adding additional thermoplastic core material until the desired proportions are obtained.

For reasons of practicality and economy, it is preferred that core layer (a) and skin layer(s)(b) be coextruded to provide the facing layer in a single operation. Thereafter, the laminate (whether obtained by extrusion or some other technique) is subjected to biaxial orientation, or orientation, to an extent and at a temperature calculated to obtain the maximum degree of opacity without any significant impairment in the physical characteristics, including appearance, of the resulting film structure. As is evident, as the materials employed change, the conditions of biaxial orientation will change. By way of exemplification, when PBT is used as the material of the void-initiating particles, a machine direction orientation of from 4 to 8 times and a transverse direction orientation of from about 4 to 8 times at a drawing temperature of from 100° C. to 160° C. yields a biaxially oriented pressure sensitive label stock facing layer of from 0.7 to 3 mils overall thickness.

As previously stated, the pressure sensitive adhesive which is directly or indirectly applied to the exposed surface of core layer (a) or, as the case may be, to the exposed surface of optional lower skin layer (b), is not continuous throughout this surface (as it would be in the case of a conventional pressure sensitive face stock), but is applied as discrete, which is to say, discontinuous or noncontiguous, areas of said surface. In a preferred embodiment, the adhesive is applied as individually isolated areas of adhesive surrounded by areas devoid of adhesive. In every case, the area occupied by adhesive will be less than the total area available for the application of adhesive. In general, the adhesive areas can take up from about 20 to about 80 percent of the reverse side of the facing layer and preferably from about 40 to about 60 percent of this area.

The adhesive can be applied to the facing layer in a random distribution of discrete areas or as a regular pattern thereof, preferably the latter. the areas of adhesive can be geometrically irregular or regular, preferably the latter. One suitable arrangement providing a wrinkle-resistant facing layer in accordance with this invention comprises uniformly distributed circular "dots" of adhesive occupying approximately 50 percent of the exposed surface of lower (optional) skin layer (b). Other arrangements containing somewhat more or less than this area of adhesive and/or different patterns of adhesive distribution can also provide an acceptably wrinkle-resistant lustrous, opaque laminate film facing layer. Discrete areas of adhesive can be applied to the reverse surface of the facing layer in accordance with the requirements of this invention employing a variety of techniques including "printing" the adhesive upon the surface in any desired pattern, applying the adhesive through a mask or stencil. Alternatively, adhesive can be applied to the entire reverse surface which is thereafter overlaminated with a film possessing cutouts to permit exposure of discrete areas of adhesive. However, this embodiment will ordinarily not be preferred since it is wasteful of adhesive and may require a relatively heavy gauge overlaminating film for proper processing. The adhesive is preferably applied after orientation of the facing layer in order to achieve greater control over its application thereto.

Although the pressure sensitive adhesive material can be applied directly to the facing layer, in some cases it may be more advantageous to apply the adhesive to the release sheet. As the facing layer is united with the release sheet, the adhesive will transfer from the latter to the former. Employing this indirect method of applying pressure sensitive adhesive material to the facing layer, any potential for damage to this layer which might result from the presence of solvent in the adhesive material or, if the material is of the hot melt type, the elevated temperature of adhesive lay-down, can be readily minimized or avoided.

It is important that the adhesive-free areas surrounding the areas of adhesive on the facing layer exhibit little or no tendency to adhere to the material of the collapsible wall container. Accordingly, the use of a thermoplastic resin for the construction of core layers (a) or, as the case may be, optional skin layer (b), which inherently possesses a cling force for the container wall material, or the presence of materials known to impart a cling property to thermoplastic films should ordinarily be avoided. Advantageously, the resin used in the fabrication of the adhesive-bearing layer can contain an additive which inhibits or minimizes cling or imparts a slip property between the adhesive-free areas of the film and the container wall material. Known and conventional slip agents, antistatic agents, etc. can be incorporated into the resin for this purpose.

The pressure sensitive adhesive component can be selected from amongst any of the materials which are known to be useful for this purpose. In general, non-solvent pressure sensitive adhesive materials, e.g., those of the hot melt variety, are preferred to solvent-based pressure sensitive materials as even the temporary presence of solvent, particularly toluene which is commonly encountered in solvent-based pressure sensitive adhesive systems, can have deterious affects on the thermoplastic resin(s) used in the construction of the label facing. Useful pressure sensitive materials include the normally non-tacky elastomers, e.g., natural and/or synthetic rubbers, butadiene-styrene rubbers, polyisobutylene rubbers, isopolybutadiene rubbers, ethylene-propylene terpolymer rubbers, polyacrylic rubbers, polyvinyl ether rubbers, butadiene-acrylonitrile rubbers, butadiene-styrene-acrylonitrile rubbers, butyl rubbers, etc., in combination with tacky or tackifying resins, e.g., a rosin ester, a hydrogenated rosin ester, the glycerol ester of hydrogenated rosin, a polyterpene resin, a coumaroneindene resin, crude rubber, a polyisobutylene or other unsaturated hydrocarbon resin, a phenolated terpene, a petroleum resin, etc. The pressure sensitive adhesive can also contain additives such as antioxidants, fillers, and the like, as is well known.

The invention contemplates the use of known types of release sheets, e.g., those prepared from a cellulosic substrate. Polymeric film release sheets can also be employed. The release agent can be selected from any of the materials known to be useful for their release properties for pressure-sensitive adhesives. Common types are silicones and modified silicones, the modification including both copolymerization or silicones with other non-release chemical agents or by adding non-silicone materials to a silicone coating solution prior to surface application of the release agent to the release layer. Other release agents such as polyethylene, fluorocarbon, the Werner type chromium complexes and polyvinyl octadecyl carbamate can also be used. The choice of release coating is dependent on the tack and adhesion level of the pressure sensitive adhesive employed herein as is appreciated by those skilled in the art. As previously stated, the pressure sensitive adhesive material can be applied to the release sheet from which it will ultimately transfer to the facing layer.

The following examples are illustrative of the invention.

EXAMPLE 1

A mixture of isotactic polypropylene (94 weight parts, MP 160° C. and a melt index of 4.5) and PBT (6 weight parts, MP 227° C.) is melted in a first extruder provided with a screw of L/D ratio of 20:1 to provide a core layer. A second extruder in association with the first extruder is supplied with the same polypropylene, but without PBT, to provide a skin layer applied to the upper surface of the core layer A melt coextrusion is carried out while maintaining the cylinder supplied with the core material at a temperature ranging from 190° C. to 220° C. The polypropylene to be extruded as the skin layer is maintained at a temperature of 220° C. A film structure is coextruded with a core thickness of 60% of the total extruded thickness, the skin layer representing the remaining 40% of the total laminate thickness. The unoriented film structure measures approximately 40 mils in thickness. This film structure is subsequently oriented seven by seven and one-half times using a commercially available sequential biaxial orientation apparatus causing void formation and opacification in the core layer and solid state crystallization of the polypropylene in both layers. The MD orientation temperature is about 105° C. and the TD orientation 135° C. The resulting 1.9 mil coextruded pressure sensitive label stock facing layer has an opacity of 20% transmission and a 45° gloss of 120% and possesses a lustrous, pearlescent appearance.

Thereafter, a hot melt pressure sensitive adhesive is applied to a release layer coated with a silicone release agent. The adhesive is laid down as a regularly spaced pattern of circular "dots" which take up about 50% of the total available area of the release layer. Following the joining of the facing layer and release layer, the pressure sensitive adhesive is transferred to the facing layer in the aforesaid pattern of circular dots.

A pressure sensitive label based on the foregoing facing layer is applied to a squeeze bottle. Similarly, the same facing layer but one possessing a continuously applied layer of the pressure sensitive adhesive is applied to an identical squeeze bottle. Each labeled bottle is subjected to an equivalent number of similar squeezings after which the appearances of the labels are compared. Whereas the label possessing the continuously applied adhesive shows considerable permanent creasing, or wrinkling, and a generally unattractive appearance, the label possessing the discrete areas of adhesive remains smooth with little if any of such creasing or wrinkling.

EXAMPLE 2

Example 2 is repeated except that a third extruder is placed in line with the first two to provide a coextruded film possessing a lower skin layer on the exposed surface of the core layer. Thereafter, pressure sensitive adhesive is indirectly applied to the exposed surface of the lower skin layer as in Example 1. Following substantially the same comparative testing procedure described in Example 1, the facing layer is observed to remain smooth and essentially wrinkle-free in appearance while the same facing layer but one possessing the adhesive applied upon its entire reverse surface is seen to be considerably wrinkled.

What is claimed is:

1. A pressure sensitive label stock material possessing a wirnkle-resistant lustrous, opaque biaxially oriented polymer film laminate facing layer for application to a collapsible wall type container, the facing layer comprising:

(a) a thermoplastic core layer having an upper and lower surface and a strata of voids located within said substrate layer, there being positioned within at least a substantial number of said voids at least one void-initiating particle which is phase distinct and incompatible with the surrounding thermoplastic material, the void space occupied by said particle being substantially less than the volume of said void, with one generally cross-sectional dimension of said particle at least approximating a corresponding cross-sectional dimension of said void;

(b) a void-free thermoplastic skin layer affixed to the upper surface and, optionally, to the lower surface of core layer (a), and;

(c) discrete areas of pressure sensitive adhesive directly or indirectly applied to the exposed surface of core layer (a) or, where an optional skin layer (b) has been applied to the lower surface of core layer (a), to the exposed surface of optional skin layer (b), the adhesive-free areas of the exposed surface of core layer (a), or, where present, the adhesive-free areas of the exposed surface of optional skin layer (b), exhibiting little or no tendency to adhere to the material of the collapsible wall type container to which the facing layer is applied.

2. The label stock material of claim 1 wherein the adhesive-free areas of the exposed surface of core layer (a), or, where present, the adhesive-free areas of optional skin layer (b), exhibit little or no cling to the material of the collapsible wall type container.

3. The label stock material of claim 1 wherein the adhesive-free areas of the exposed surface of core layer (a), or, where present, the adhesive-free areas of the exposed surface of optional skin layer (b) exhibit slip relative to the material of the collapsible wall container.

4. The label stock material of claim 1 wherein the thermoplastic resin of core layer (a), or, where present, the thermoplastic resin of optional skin layer (b), contains a material which inhibits or minimizes cling of the resin to the material of the collapsible wall container and/or imparts slip relative thereto.

5. The label stock material of claim 1 wherein core layer (a) and skin layer(s)(b) of the facing layer are fabricated from an isotactic polypropylene.

6. The label stock material of claim 1 wherein the void-initiating particles are fabricated from a polymeric material.

7. The label stock material of claim 5 wherein the void-initiating particles are fabricated from a polymeric material.

8. The label stock material of claim 7 wherein the polymeric material is polybutylene terephthalate.

9. The label stock material of claim 1 wherein the facing layer is a coextruded structure.

10. The label stock material of claim 1 wherein the discrete areas of pressure sensitive adhesive occupy from about 20 to about 80 percent of the exposed surface of core layer (a) or optional lower skin layer (b).

11. The label stock material of claim 1 wherein the discrete areas of pressure sensitive adhesive occupy from about 40 to about 60 percent of the exposes surface of core layer (a) or optional lower skin layer (b).

12. The label stock material of claim 1 wherein the discrete areas of pressure sensitive adhesive are arranged in a regular pattern.

13. The label stock material of claim 1 wherein discrete, geometrically regular areas of pressure sensitive adhesive are arranged in a regular pattern.

14. The label stock material of claim 1 wherein the pressure sensitive adhesive is of the hot melt type.

* * * * *